(12) United States Patent
Sawabe et al.

(10) Patent No.: US 8,641,819 B2
(45) Date of Patent: Feb. 4, 2014

(54) CEMENT COMPOSITION AND PROCESS FOR PRODUCING CEMENT COMPOSITION

(75) Inventors: Norihiko Sawabe, Ube (JP); Hitoshi Tonokohchi, Ube (JP); Takayasu Itoh, Ube (JP); Hiroshi Mikami, Ube (JP)

(73) Assignee: UBE Industries, Ltd., Ube-Shi, Yamaguchi (JP)

( * ) Notice: Subject to any disclaimer, the term of this patent is extended or adjusted under 35 U.S.C. 154(b) by 0 days.

(21) Appl. No.: 13/701,278

(22) PCT Filed: May 24, 2011

(86) PCT No.: PCT/JP2011/061868
§ 371 (c)(1),
(2), (4) Date: Nov. 30, 2012

(87) PCT Pub. No.: WO2011/152248
PCT Pub. Date: Dec. 8, 2011

(65) Prior Publication Data
US 2013/0068140 A1   Mar. 21, 2013

(30) Foreign Application Priority Data

Jun. 1, 2010 (JP) ................................. 2010-126104
Jan. 20, 2011 (JP) ................................. 2011-010229

(51) Int. Cl.
*C04B 14/00* (2006.01)
(52) U.S. Cl.
USPC ............................. 106/713; 106/733; 106/739
(58) Field of Classification Search
USPC .......................................... 106/713, 733, 739
See application file for complete search history.

(56) References Cited

FOREIGN PATENT DOCUMENTS

| JP | 2003-095710 A | 4/2003 |
| JP | 2004-292307 A | 10/2004 |
| JP | 2005-272223 A | 10/2005 |
| JP | 2005-350337 A | 12/2005 |
| JP | 2010-222171 A | 10/2010 |

OTHER PUBLICATIONS

International Search Report (PCT/ISA/210) issued on Aug. 30, 2011, by the Japanese Patent Office as the International Searching Authority for International Application No. PCT/JP2011/061868.
Written Opinion (PCT/ISA/237) issued on Aug. 30, 2011, by the Japanese Patent Office as the International Searching Authority for International Application No. PCT/JP2011/061868.

(Continued)

*Primary Examiner* — Paul Marcantoni
(74) *Attorney, Agent, or Firm* — Buchanan Ingersoll & Rooney PC

(57) ABSTRACT

A cement composition, and a process for producing a cement composition, wherein the cement composition has the Sr content of 0.065 mass % to 1.0 mass % and the MgO content of greater than 1.0 mass % to 3.0 mass %. The process for producing a cement composition comprises a step (A) of adjusting the basic raw material units of raw materials selected from the group consisting of limestone, silica stone, coal ash, clay, blast furnace slag, soil generated by construction work, sewage sludge, hydrocake and iron sources so that the cement composition has the Sr content of 0.065 mass % to 1.0 mass % and the MgO content of greater than 1.0 mass % to 3.0 mass %, blending the adjusted raw materials and burning to produce cement clinker, and a step (B) of mixing the cement clinker with gypsum and an admixture of limestone and blast furnace slag followed by grinding.

20 Claims, 1 Drawing Sheet

(56) References Cited

OTHER PUBLICATIONS

Massazza, "Influenza Dello Stronzio Sulla Composizione Mineralogica Dei Clinker", Cemento, Dec. 1974, pp. 167-176, vol. 71, No. 4.

Japan Concrete Institute, Concrete Binran, $2^{nd}$ Edition, Gihodo Shuppan Co., Ltd., Feb. 1996, p. 46.

Juel et al., "The influence of earth alkalis on the mineralogy in a mineralized Portland cement clinker", Cement and Concrete Research, Jun. 2001, pp. 893-897, vol. 31, No. 6.

Ito, "Relationship between property of early hydration of cement and aluminate contents determined by Rietveld method", Cement and Concrete, Feb. 2003, pp. 29-35, No. 56.

Japan Cement Association, Introduction to Concrete and Cement, Mar. 2009, pp. 19-20.

Notification of Transmittal of Translation of the International Preliminary Report on Patentability (Chapter I or Chapter II)(PCT/IB/338) and International Preliminary Report on Patentability (Form PCT/IB/373), Written Opinion of the International Searching Authority (Translation), issued on Jan. 17, 2013, in corresponding International Application No. PCT/JP2011/061868. (8 pages).

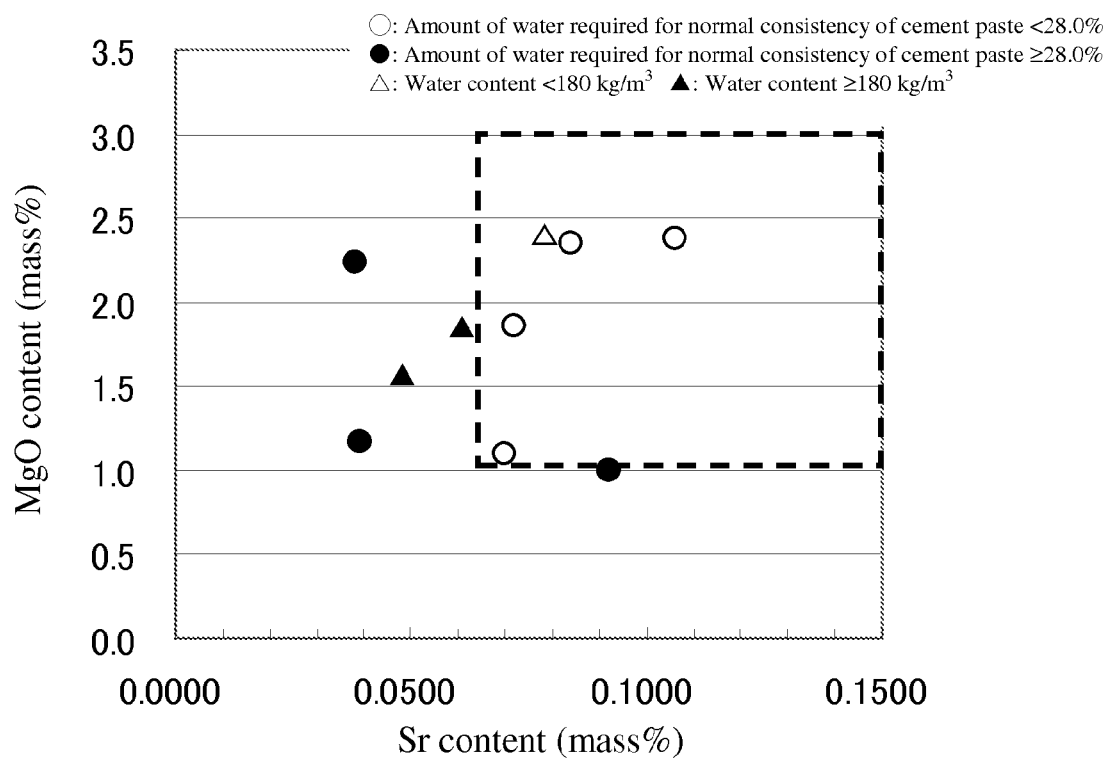

CEMENT COMPOSITION AND PROCESS FOR PRODUCING CEMENT COMPOSITION

TECHNICAL FIELD

The present invention relates to a cement composition and a process for producing the cement composition.

BACKGROUND ART

Waste having high aluminum (Al) content in the form of coal ash or soil generated by construction work and the like has come to be used in large amounts as a cement clinker raw material from the viewpoint of effective utilization of waste. In general, since the amount of the aluminate phase ($C_3A$) present in cement clinker increases with the amount of Al contained in the raw materials, the amounts of Al and $C_3A$ contained in cement clinker increase accompanying expanded utilization of waste containing large amounts of Al such as coal ash. Therefore, in order to obtain a suitably fresh properties (fluidity), it is necessary to increase the amount of water required for normal consistency of cement paste (amount of water for achieving a standard consistency of cement paste: amount of water required to obtain a fixed consistency) or the water content of concrete. On the other hand, when the amount of water required for normal consistency of cement paste or the water content of concrete is increased, there is concern over this increase having a detrimental effect on properties other than fresh properties such as strength development. Consequently, there is the problem of being forced to limit the amount of waste used to a fixed amount in order to not allow an increase in the amount of water required for normal consistency of cement paste or the water content of concrete.

Non-Patent Document 1 describes chemical analysis values for various types of Portland cement (normal Portland cement (N), high early strength Portland cement (H), moderate heat Portland cement (M) and low heat Portland cement (L)). The amounts of $C_3A$ are calculated from each component of the chemical analysis values (such as $Al_2O_3$ and $Fe_2O_3$) using the Bogue equation, and the amounts of water required for normal consistency of cement paste (amount of water for achieving a standard consistency of cement paste: amount of water required to obtain a fixed consistency) required for these amounts of $C_3A$ are shown in Table 1.

TABLE 1

| Type | | $Al_2O_3$ (%) | $Fe_2O_3$ (%) | $C_3A$ calculated value (%) | Amount of water required for normal consistency of cement paste (%) |
|---|---|---|---|---|---|
| Portland cement | N (normal) | 5.15 | 2.80 | 8.9 | 27.9 |
| | H (high early strength) | 4.83 | 2.68 | 8.3 | 30.6 |
| | M (moderate heat) | 3.87 | 4.07 | 3.4 | 27.1 |
| | L (low heat) | 2.66 | 2.55 | 2.7 | 27.4 |

As shown in Table 1, normal Portland cement (N) and high early strength Portland cement (H), which have high $C_3A$ contents, have higher amounts of water required for normal consistency of cement paste in comparison with moderate heat Portland cement (M) and low heat Portland cement (L).

Examples of methods used to improve the fluidity of mortar or concrete include "using an inorganic powder in the manner of limestone fine powder (Patent Document 1)", "adjusting the form of the gypsum mixed in (Patent Document 2)", and "using an aggregate having a particle size within a specific range and having a favorable particle form (Patent Document 3)", while an example of another common method is "the use of an admixture (plasticizer)". However, these methods have the problem of having a detrimental effect on strength development while also resulting in increased production costs.

CITED DOCUMENTS

Patent Documents

Patent Document 1: Japanese Unexamined Patent Publication No. 2003-95710
Patent Document 2: Japanese Unexamined Patent Publication No. 2004-292307
Patent Document 3: Japanese Unexamined Patent Publication No. 2005-272223

Non-Patent Documents

Non-Patent Document 1: Japan Cement Association, Introduction to Concrete and Cement, p. 19-20, March 2009

DISCLOSURE OF THE INVENTION

Problems to be Solved by the Invention

With the foregoing in view, an object of the present invention is to provide a cement composition that improves the fluidity of cement paste, mortar and concrete even in the case where comparatively large amounts of waste such as coal ash or soil generated by construction work are used and the contents of Al and $C_3A$ in the cement clinker have increased, and to provide a process for producing that cement composition.

Means for Solving the Problems

As a result of conductive extensive studies to achieve the aforementioned object, the inventors of the present invention found that, in cement that uses comparatively large amounts of waste such as coal ash or soil generated by construction work and has a comparatively high Al content or $C_3A$ content in the cement composition, the strontium (Sr) content and magnesium oxide (MgO) content in the cement composition have an effect on improving fluidity of cement paste, mortar and concrete, thereby leading to completion of the present invention.

Namely, the present invention relates to a cement composition which has the Sr content of 0.065 mass % to 1.0 mass % and the MgO content of greater than 1.0 mass % to 3.0 mass %. The present invention also relates to a cement composition which has the free CaO content of 1.5 mass % or less. Moreover, the present invention relates to a cement composition which has the $SO_3$ content of 1.6 mass % to 2.6 mass %, and $C_3S$ content of 50 mass % to 70 mass %, $C_2S$ content of 5 mass % to 25 mass %, $C_3A$ content of 6 mass % to 15 mass % and $C_4AF$ content of 7 mass % to 15 mass % as determined with the Bogue equations.

The present invention also relates to a process for producing a cement composition comprising a step (A) of adjusting the basic raw material units of raw materials selected from the group consisting of limestone, silica stone, coal ash, clay, blast furnace slag, soil generated by construction work, sewage sludge, hydrocake and iron sources so that the cement composition has the Sr content of 0.065 mass % to 1.0 mass % and the MgO content of greater than 1.0 mass % to 3.0 mass %, blending the adjusted raw materials and burning to produce cement clinker, and a step (B) of mixing the cement clinker with gypsum and an admixture consisting of limestone and blast furnace slag followed by grinding. The present invention also relates to a process for producing a cement composition in which shells are used as a partial substitute for the limestone. The present invention relates to a process for producing a cement composition in which 700 kg to 1400 kg of limestone, 20 kg to 150 kg of silica stone, 0 kg to 300 kg of coal ash, 0 kg to 100 kg of clay, 0 kg to 100 kg of blast furnace slag, 10 kg to 150 kg of soil generated by construction work, 0 kg to 100 kg of sewage sludge, 0 kg to 100 kg of hydrocake and 30 kg to 80 kg of iron sources are blended per ton of cement clinker for use as the cement clinker raw materials in the step (A). The present invention also relates to a process for producing a cement composition in which soil generated by construction work and coal ash are blended in the step (A) so that the mass ratio of soil generated by construction work to coal ash is 0.13 to 1.6. Moreover, the present invention relates to a process for producing a cement composition in which the soil generated by construction work has the Sr content of 0.01 mass % to 1.0 mass %, and the coal ash has the Sr content of 0.02 mass % to 0.4 mass % in the step (A).

Effects of the Invention

According to the present invention, by making the Sr content and MgO content of a cement composition to be within the proper ranges, the amount of water required for normal consistency of cement paste and the water content of concrete can be reduced, thereby making it possible to improve fluidity of cement paste, mortar and concrete.

BRIEF DESCRIPTION OF THE DRAWINGS

FIG. 1 is a drawing illustrating the relationship between Sr content and MgO content of cement compositions and the amount of water required for normal consistency of cement paste or the water content of concrete.

BEST MODE FOR CARRYING OUT THE INVENTION

The following provides an explanation of preferred embodiments of the present invention.

The cement composition of the present invention is characterized by having the Sr content of 0.065 mass % to 1.0 mass % and the MgO content of greater than 1.0 mass % to 3.0 mass %.

Sr and MgO in cement compositions constitute minor or trace components. The inventors of the present invention determined that the Sr content and MgO content of a cement composition is related to the fluidity of mortar and concrete, and found that by making the Sr content and MgO content to be within proper ranges, the amount of water required for normal consistency of cement paste and the water content of concrete can be reduced, thereby making it possible to improve fluidity of cement paste, mortar and concrete. As a result, the fluidity of cement paste, mortar and concrete using such a cement composition can be maintained and improved even if using waste such as coal ash or soil generated by construction work, for which effective utilization is desired.

The Sr content and MgO content of the cement composition refer to the percentages at which they are contained based on the total mass of the cement composition (mass %). The Sr content of the cement composition can be measured in compliance with "ICP atomic emission spectroscopy and electrothermal atomic absorption spectrometry" as defined in standard test method JCAS I-52 2000 of the Japan Cement Association. The MgO content of the cement composition can be measured in compliance with "Methods for chemical analysis of Portland cement" as defined in JIS R 5202:1998. The mineral composition of the cement composition ($C_3S$, $C_2S$, $C_3A$ and $C_4AF$) can be measured in compliance with the Bogue equations or Rietveld analysis of powder X-ray diffraction (XRD) (XRD/Rietveld analysis).

The Sr content of the cement composition is 0.065 mass % to 1.0 mass %, preferably 0.067 mass % to 0.5 mass %, more preferably 0.068 mass % to 0.3 mass %, even more preferably 0.070 mass % to 0.20 mass %, and particularly preferably 0.070 mass % to 0.15 mass %.

The MgO content of the cement composition is greater than 1.0 mass % to 3.0 mass %, preferably greater than 1.0 mass % to 2.6 mass %, more preferably 1.1 mass % to 2.6 mass %, even more preferably 1.1 mass % to 2.5 mass %, particularly preferably 1.2 mass % to 2.5 mass %, and extremely preferably 1.8 mass % to 2.4 mass %.

The $C_3A$ content of the cement composition as measured in compliance with XRD/Rietveld analysis is 0.1 mass % to 11.0 mass %, preferably 1.0 mass % to 10.5 mass %, more preferably 2.0 mass % to 10.2 mass %, even more preferably 3.0 mass % to 10.2 mass %, particularly preferably 3.0 mass % to 9.0 mass %, and extremely preferably 3.0 mass % to 7.0 mass %.

If the cement composition has the Sr content of less than 0.065 mass % or the MgO content of 1.0 mass % or less, the fluidity of mortar and concrete may demonstrate a decrease and the amount of water required for normal consistency of cement paste or the water content of concrete for obtaining proper fluidity may increase.

The free CaO content of the cement composition is preferably 1.5 mass % or less, more preferably 0.1 mass % to 1.2 mass %, even more preferably 0.2 mass % to 1.0 mass %, and particularly preferably 0.3 mass % to 0.8 mass %. If the free CaO content of the cement composition exceeds 1.5 mass %, proper strength development cannot be obtained.

The $SO_3$ content of the cement composition of the present invention is preferably 1.6 mass % to 2.6 mass %, more preferably 1.7 mass % to 2.5 mass %, even more preferably 1.8 mass % to 2.4 mass % and particularly preferably 1.8 mass % to 2.3 mass %. If the $SO_3$ content of the cement composition is within the aforementioned ranges, strength development of mortar and concrete can be improved while suitably maintaining fluidity of the cement composition. The $SO_3$ content of the cement composition refers to the percentage contained based on the total mass of the cement composition (mass %), and this percentage contained can be measured in compliance with "Methods for chemical analysis of Portland cement" as defined in JIS R 5202:1998.

The mineral composition of the cement composition of the present invention as determined using the Bogue equations is preferably such that the $C_3S$ content is 50 mass % to 70 mass %, the $C_2S$ content is 3 mass % to 25 mass %, the $C_3A$ content is 6 mass % to 15 mass % and the $C_4AF$ content is 7 mass % to 15 mass %, more preferably such that the $C_3S$ content is 51 mass % to 67 mass %, the $C_2S$ content is 5 mass % to 25 mass %, the $C_3A$ content is 8 mass % to 13 mass % and the $C_4AF$ content is 8 mass % to 12 mass %, even more preferably such that the $C_3S$ content is 52 mass % to 65 mass %, the $C_2S$ content is 8 mass % to 22 mass %, the $C_3A$ content is 8 mass % to 12 mass % and the $C_4AF$ content is 8 mass % to 11 mass %, and particularly preferably such that the $C_3S$ content is 53 mass % to 65 mass %, the $C_2S$ content is 8 mass % to 21 mass %, the $C_3A$ content is 8 mass % to 10 mass % and the $C_4AF$ content is 8 mass % to 10 mass %.

Here, the $C_3S$ content, $C_2S$ content, $C_3A$ content and $C_4AF$ content of the cement composition as calculated using the Bogue equations are determined according to the following equations [1] to [4].

$C_3S$ content (mass %)=4.07×CaO content (mass %)−7.60×$SiO_2$ content (mass %)−6.72× $Al_2O_3$ content (mass %)−1.43×$Fe_2O_3$ content (mass %)−2.85×$SO_3$ content (mass %) [1]

$C_2S$ content (mass %)=2.87×$SiO_2$ content (mass %)−0.754×$C_3S$ content (mass %) [2]

$C_3A$ content (mass %)=2.65×$Al_2O_3$ content (mass %)−1.69×$Fe_2O_3$ content (mass %) [3]

$C_4AF$ content (mass %)=3.04×$Fe_2O_3$ content (mass %) [4]

The CaO, $SiO_2$, $Al_2O_3$ and $Fe_2O_3$ in the equations respectively refer to the contained percentages (mass %) of CaO, $SiO_2$, $Al_2O_3$ and $Fe_2O_3$ in the cement composition based on the total mass of the cement composition. These contained percentages can be measured in accordance with "Methods for chemical analysis of Portland cement" as defined in JIS R 5202 or "Methods for X-ray fluorescence analysis of cement" as defined in JIS R 5204.

The method for producing the cement composition of the present invention comprises a step (A) of adjusting the basic raw material units of raw materials selected from the group consisting of limestone, silica stone, coal ash, clay, blast furnace slag, soil generated by construction work, sewage sludge, hydrocake and iron sources so that the cement composition has the Sr content of 0.065 mass % to 1.0 mass % and the MgO content of greater than 1.0 mass % to 3.0 mass %, blending the adjusted raw materials and burning to produce cement clinker, and a step (B) of mixing the resulting cement clinker with gypsum followed by grinding.

Examples of raw materials of the cement clinker in the step (A) include limestone, silica stone, coal ash, clay, blast furnace slag, soil generated by construction work, sewage sludge, hydrocake and iron sources. Coal ash is generated from coal-fired thermal power plants and the like, and examples thereof include cinder ash, fly ash, clinker ash and bottom ash. Examples of soil generated by construction work include surplus soil, mud and waste soil generated secondarily accompanying implementation of construction work. Examples of sewage sludge include sludge alone as well as sludge converted to a dry powder following addition of limestone and incineration residue. Examples of iron sources include copper slag and blast furnace dust.

The cement clinker raw material in the step (A) is preferably obtained by blending 700 kg to 1400 kg of limestone, 20 kg to 150 kg of silica stone, 0 kg to 300 kg of coal ash, 0 kg to 100 kg of clay, 0 kg to 100 kg of blast furnace slag, 10 kg to 150 kg of soil generated by construction work, 0 kg to 100 kg of sewage sludge, 0 kg to 100 kg of hydrocake and 30 kg to 80 kg of iron sources per ton of cement clinker. The cement clinker raw material in the step (A) is more preferably obtained by blending 800 kg to 1300 kg of limestone, 20 kg to 100 kg of silica stone, 50 kg to 250 kg of coal ash, 0 kg to 80 kg of clay, 5 kg to 50 kg of blast furnace slag, 20 kg to 150 kg of soil generated by construction work, 0 kg to 70 kg of sewage sludge, 20 kg to 80 kg of hydrocake and 30 kg to 60 kg of iron sources per ton of cement clinker. The cement clinker raw material, with respect to limestone, coal ash and soil generated by construction work in particular, is particularly preferably obtained by blending 900 kg to 1200 kg of limestone, 80 kg to 270 kg of coal ash and 20 kg to 150 kg of soil generated by construction work per ton of cement clinker, and even more preferably obtained by blending 1000 kg to 1100 kg of limestone, 100 kg to 250 kg of coal ash and 30 kg to 100 kg of soil generated by construction work per ton of cement clinker. In the present description, the term "basic raw material unit" refers to the mass of each raw material used in producing one ton of cement clinker (kg/t clinker).

The method used to adjust the basic raw material units of the cement clinker raw material in the step (A) specifically consists of measuring the Sr content and MgO content of the sampled cement composition, and adjusting the basic raw material units of the cement clinker raw materials so that the Sr content and MgO content are within the specified ranges.

Among the cement clinker raw materials, the Sr content of limestone serving as a calcium source raw material and the amounts of coal ash and soil generated by construction work used (basic raw material units) have an effect on the Sr content of the cement composition. In order to make the Sr content of the cement composition to be within the specified range, the Sr content is preferably adjusted with the mass ratio of the soil generated by construction work to coal ash according to the Sr content of the limestone. For example, in the case the Sr content of the limestone is low, the amounts of coal ash and soil generated by construction work used (raw material unit) can be adjusted so as to increase the mass ratio of the soil generated by construction work to coal ash. The mass ratio of soil generated by construction work to coal ash (soil generated by construction work (kg/t clinker)/coal ash (kg/t clinker) is preferably 0.13 to 1.6, more preferably 0.15 to 1.5, even more preferably 0.2 to 1.5 and particularly preferably 0.2 to 1.4.

In order to make the MgO content of the cement composition to be within the specified range, each of the cement clinker raw materials is preferably adjusted in basic raw material units followed by blending these raw materials so that the content of MgO from the raw materials contained in the cement composition is greater than 1.0 mass % to 3.0 mass % based on the contents of MgO in the raw materials selected from limestone, silica stone, coal ash, clay, blast furnace slag, soil generated by construction work, hydrocake and iron sources consisting of copper slag and blast furnace dust.

Raw materials in which the Sr content and MgO content of each raw material are within the following ranges are preferably used for the cement clinker raw material. Here, the Sr content and MgO content in each of the raw materials refer to the contained percentages (mass %) based on each raw material (100 mass %).

Limestone in which the Sr content is preferably 0.01 mass % to 0.10 mass %, more preferably 0.01 mass % to 0.09 mass %, even more preferably 0.01 mass % to 0.08 mass % and particularly preferably 0.015 mass % to 0.08 mass % is used for the limestone. Limestone in which the MgO content is preferably 0.1 mass % to 2.0 mass %, more preferably 0.1 mass % to 1.5 mass %, even more preferably 0.1 mass % to 1.3 mass % and particularly preferably 0.2 mass % to 1.3 mass % is used for the limestone.

Waste shells are preferably used as raw material in order to make the Sr content to be within the specified range. Although shells are marine waste, their CaO content and MgO content are roughly equal to those of limestone, and their Sr content is higher than that of limestone. Therefore, shells can be used as a partial substitute for limestone that is a natural resource, making them useful in terms of being able to conserve resources. Typical examples of shells include scallop shells, pearl oyster shells and oyster shells. In the case of substituting a portion of the limestone with shells, a calcium source raw material (limestone+shells) is used such that Sr content is preferably 0.02 mass % to 0.3 mass %, more preferably 0.02 mass % to 0.26 mass %, even more preferably 0.02 mass % to 0.2 mass % and particularly preferably 0.025 mass % to 0.2 mass %. Shells can be used that preferably have an Sr content of 0.02 mass % to 1.0 mass %, more preferably 0.02 mass % to 0.5 mass %, even more preferably 0.05 mass % to 0.3 mass % and particularly preferably 0.03 mass % to 0.3 mass %. Shells can be used that preferably have a CaO content of 35 mass % to 55 mass %, more preferably 40 mass % to 55 mass %, even more preferably 40 mass % to 50 mass % and particularly preferably 45 mass % to 50 mass %. Shells can be used that preferably have the MgO content of 0.1 mass % to 5.0 mass %, more preferably 0.1 mass % to 3.0 mass %, even more preferably 0.1 mass % to 2.0 mass % and particularly preferably 0.1 mass % to 1.0 mass %. In the case of using limestone having a low Sr content in which the Sr content is less than 0.02 mass %, a portion of the limestone is preferably substituted with shells. Materials having comparatively high contents of CaO, Sr and MgO may also be used in addition to shells.

Silica stone in which the Sr content is preferably 0.001 mass % to 0.04 mass %, more preferably 0.001 mass % to 0.03 mass %, even more preferably 0.001 mass % to 0.025 mass % and particularly preferably 0.001 mass % to 0.02 mass % is used for the silica stone. Silica stone in which the MgO content is preferably 0.01 mass % to 1.0 mass %, more preferably 0.03 mass % to 0.8 mass % and even more preferably 0.03 mass % to 0.6 mass % is used for the silica stone.

Coal ash in which the Sr content is preferably 0.02 mass % to 0.4 mass %, more preferably 0.02 mass % to 0.3 mass %, even more preferably 0.02 mass % to 0.25 mass % and particularly preferably 0.02 mass % to 0.2 mass % is used for the coal ash. Coal ash in which the MgO content is preferably 0.1 mass % to 3.0 mass %, more preferably 0.2 mass % to 2.5 mass %, even more preferably 0.4 mass % to 2.5 mass % and particularly preferably 0.5 mass % to 2.0 mass % is used for the coal ash.

Blast furnace slag in which the Sr content is preferably 0.02 mass % to 0.2 mass %, more preferably 0.02 mass % to 0.15 mass %, even more preferably 0.02 mass % to 0.10 mass % and particularly preferably 0.03 mass % to 0.1 mass % is used for the blast furnace slag. Blast furnace slag in which the MgO content is preferably 3.0 mass % to 9.0 mass %, more preferably 4.0 mass % to 8.0 mass %, even more preferably 5.0 mass % to 7.0 mass % and particularly preferably 5.0 mass % to 6.0 mass % is used for the blast furnace slag.

Clay in which the Sr content is preferably 0.001 mass % to 0.03 mass %, more preferably 0.003 mass % to 0.025 mass %, even more preferably 0.003 mass % to 0.02 mass % and particularly preferably 0.004 mass % to 0.02 mass % is used for the clay. Clay in which the MgO content is preferably 0.3 mass % to 6.0 mass %, more preferably 0.5 mass % to 5.0 mass %, even more preferably 0.5 mass % to 4.0 mass % and particularly preferably 0.4 mass % to 3.0 mass % is used for the clay.

Soil generated by construction work in which the Sr content is preferably 0.01 mass % to 1.0 mass %, more preferably 0.01 mass % to 0.7 mass %, even more preferably 0.01 mass % to 0.5 mass % and particularly preferably 0.02 mass % to 0.4 mass % is used for the soil generated by construction work. Soil generated by construction work in which the MgO content is preferably 0.5 mass % to 5.0 mass %, more preferably 0.5 mass % to 4.0 mass %, even more preferably 1.0 mass % to 3.0 mass % and particularly preferably 1.5 mass % to 3.0 mass % is used for the soil generated by construction work.

Sewage sludge in which the Sr content is preferably 0.001 mass % to 0.1 mass %, more preferably 0.001 mass % to 0.07 mass %, even more preferably 0.001 mass % to 0.05 mass % and particularly preferably 0.001 mass % to 0.03 mass % is used for the sewage sludge. Sewage sludge in which the MgO content is preferably 0.5 mass % to 4.0 mass %, more preferably 0.5 mass % to 3.0 mass %, even more preferably 0.5 mass % to 2.0 mass % and particularly preferably 0.6 mass % to 2.0 mass % is used for the sewage sludge.

Hydrocake in which the Sr content is preferably 0.1 mass % to 1.5 mass %, more preferably 0.1 mass % to 1.0 mass %, even more preferably 0.1 mass % to 0.8 mass % and particularly preferably 0.2 mass % to 0.6 mass % is used for the hydrocake. Hydrocake in which the MgO content is preferably 5 mass % to 30 mass %, more preferably 5 mass % to 25 mass %, even more preferably 10 mass % to 20 mass % and particularly preferably 10 mass % to 15 mass % is used for the hydrocake.

Copper slag in which the Sr content is preferably 0.005 mass % to 0.05 mass %, more preferably 0.005 mass % to 0.04 mass %, even more preferably 0.005 mass % to 0.03 mass % and particularly preferably 0.01 mass % to 0.03 mass % is used for the copper slag. Copper slag in which the MgO content is preferably 0.3 mass % to 2.5 mass %, more preferably 0.5 mass % to 2.0 mass %, even more preferably 0.5 mass % to 1.5 mass % and particularly preferably 0.5 mass % to 1.0 mass % is used for the copper slag.

Blast furnace dust in which the Sr content is preferably 0.001 mass % to 0.03 mass %, more preferably 0.001 mass % to 0.02 mass %, even more preferably 0.002 mass % to 0.015 mass % and particularly preferably 0.002 mass % to 0.01 mass % is used for the blast furnace dust. Blast furnace dust in which the MgO content is preferably 0.2 mass % to 3.5 mass %, more preferably 0.2 mass % to 2.5 mass %, even more preferably 0.2 mass % to 2.0 mass % and particularly preferably 0.2 mass % to 1.5 mass % is used for the blast furnace dust.

The cement clinker can be produced using existing cement production equipment such as an SP system (multistage cyclone preheating system) or NSP system (multistage cyclone preheating system combined with a calcining furnace).

In the case of production on an industrial scale, for example, a cement composition for measuring the contents of Sr and MgO is first sampled, the Sr content and MgO content of that cement composition are measured, the basic raw material units of the cement clinker are adjusted so that a cement composition has the Sr content of 0.065 mass % to 1.0 mass % and the MgO content of greater than 1.0 mass % to 3.0 mass %, these raw materials are blended and then burned to give a cement clinker. By using the resulting cement clinker, a cement composition can be produced having improved fluidity.

In the process for producing a cement composition of the present invention, the resulting cement composition preferably has the free CaO content of 1.5 mass % or less.

The following provides an explanation of an embodiment of the process for producing a cement clinker used for a cement composition of the present invention by using existing NSP cement production equipment. However, the process for producing a cement composition of the present invention is not limited to the following embodiment.

Although there are no particular limitations thereon, the method used to mix each of the raw materials of the cement clinker preferably consists of grinding and mixing the raw materials with a raw material grinding mill followed by mixing in a blending silo.

Following grinding and mixing, the cement clinker raw material can be burned using existing equipment in the form of a suspension preheater and rotary kiln. A cement clinker can be obtained for producing the cement composition which has the free CaO content of 1.5 mass % or less by changing the burning temperature, burning time and other burning conditions of the cement clinker.

Although there are no particular limitations thereon, the burning temperature of the cement clinker in the case of using NSP cement production equipment is such that the temperature of the cement clinker near the outlet of the rotary kiln is preferably 800° C. to 1700° C., more preferably 900° C. to 1600° C. and even more preferably 1000° C. to 1500° C. The burning time is preferably 20 minutes to 2 hours, more preferably 20 minutes to 1.5 hours and even more preferably 20 minutes to 1.0 hours.

After burning, the resulting cement clinker is preferably cooled with a clinker cooler provided downstream from the rotary kiln to a temperature of, for example, 100° C. to 200° C. The cooling rate is preferably 10° C./min to 60° C./min, more preferably 15° C./min to 45° C./min and even more preferably 15° C./min to 30° C./min.

In the step (B) of the present invention, the cement composition can be produced by mixing the cement clinker obtained in the step (A) with gypsum and an admixture consisting of limestone and blast furnace slag followed by grinding.

The gypsum used preferably satisfies the level of quality defined in "Natural gypsum to be used for cement" of JIS R 9151. More specifically, gypsum dihydrate, gypsum hemihydrate and insoluble anhydrous gypsum are used preferably.

In the step (B) of the present invention, the gypsum is mixed with the cement clinker so that the cement composition preferably has the $SO_3$ content of 1.6 mass % to 2.6 mass % and more preferably 1.7 mass % to 2.4 mass %, followed by grinding. Although there are no particular limitations thereon, examples of methods used for grinding include using a grinder such as a ball mill or a classifier such as a separator.

In the step (B) of the present invention, the cement composition further contains limestone and blast furnace slag as admixture. An example of the limestone used as admixture is limestone described in "Portland cement" of JIS R 5210. An example of the blast furnace slag used as admixture is blast furnace slag defined in "Blast furnace slag cement" of JIS R 5211. The cement composition may also contain admixture other than limestone and blast furnace slag. Examples of admixtures that can be used other than limestone and blast furnace slag include siliceous admixture defined in "Pozzolan cement" of JIS R 5212, and fly ash defined in "Fly ash for use in concrete" of JIS A 6201. The total contained percentage (mass %) of the admixture based on the total mass of the cement composition is preferably 5 mass % or less. In the case of using limestone and blast furnace slag for the admixture, the basic raw material units of the cement clinker raw material are preferably adjusted in consideration of the Sr content and MgO content in the admixture.

The Blaine specific surface area of the cement composition of the present invention is preferably 2800 $cm^2/g$ to 4000 $cm^2/g$. If the Blaine specific surface area is within the aforementioned range, mortar and concrete having superior strength development can be produced. The Blaine specific surface area of the cement composition is more preferably 3200 $cm^2/g$ to 3800 $cm^2/g$ and even more preferably 3200 $cm^2/g$ to 3500 $cm^2/g$.

Although the above has provided an explanation of preferred embodiments of the present invention, the present invention is not limited to the aforementioned embodiments.

EXAMPLES

Although the following provides a detailed explanation of the present invention by listing examples and comparative examples thereof, the present invention is not limited to the following examples.

Examples 1 to 7 and Comparative Examples 1 to 6

Cement Clinker Raw Materials

The Sr content and MgO content of cement clinker raw materials consisting of limestone A, limestone B, silica stone, coal ash, clay, blast furnace slag, soil generated by construction work, sewage sludge, hydrocake and iron sources (copper slag and blast furnace dust) used as Sr- and MgO-containing cement clinker raw materials were measured in advance. The Sr content and MgO content of a pre-sampled cement composition were measured. And, the basic raw material units of the cement clinker raw materials were adjusted so that the cement composition has the Sr content of 0.07 mass % to 1.0 mass % and the MgO content of 0.8 mass % to 2.6 mass %, followed by blending these raw materials. And, gypsum dihydrate was used to make the $SO_3$ content of the cement composition to be within the specified range. Table 2 shows the values of the chemical components of the limestone, silica stone, coal ash and blast furnace slag used in the examples and comparative examples. The Sr contents and MgO contents of raw materials other than those indicated in Table 2 are described below. Here, the chemical components and basic raw material units indicated below are basic raw material units based on a dry state (state not containing moisture).

Clay (Sr content=0.0138 mass %, MgO content=1.43 mass %)

Soil generated by construction work (Sr content=0.0272 mass %, MgO content=1.78 mass %)

Sewage sludge (Sr content=0.002 mass %, MgO content=0.62 mass %)

Hydrocake (Sr content=0.474 mass %, MgO content=14.19 mass %)

Copper slag (Sr content=0.0165 mass %, MgO content=0.83 mass %)

Blast furnace dust (Sr content=0.0064 mass %, MgO content=0.22 mass %)

TABLE 2

|  | Chemical components (mass %) | | | | | | | |
|---|---|---|---|---|---|---|---|---|
|  | ig. loss | $SiO_2$ | $Al_2O_3$ | $Fe_2O_3$ | CaO | MgO | $SO_3$ | Sr |
| Limestone A | 40.87 | 4.65 | 1.03 | 0.36 | 51.69 | 0.98 | — | 0.0450 |
| Limestone B | 43.26 | 1.13 | 0.28 | 0.13 | 54.63 | 0.36 | — | 0.0183 |
| Silica stone | 2.44 | 91.56 | 2.79 | 1.02 | 0.95 | 0.30 | — | 0.00481 |

TABLE 2-continued

| | Chemical components (mass %) | | | | | | |
|---|---|---|---|---|---|---|---|
| | ig. loss | SiO$_2$ | Al$_2$O$_3$ | Fe$_2$O$_3$ | CaO | MgO | SO$_3$ | Sr |
| Coal ash | 14.50 | 54.08 | 20.58 | 4.63 | 1.95 | 0.96 | 0.32 | 0.1060 |
| Blast furnace slag | 0.00 | 33.52 | 15.09 | 0.37 | 42.71 | 5.49 | — | 0.0462 |

The chemical components shown in Table 2 (ignition loss to MgO) were analyzed in compliance with "Methods for chemical analysis of aluminosilicate raw materials for ceramics" as defined in JIS M 8853:1998, while SO$_3$ content was measured in compliance with "Methods for chemical analysis of Portland cement" as defined in JIS R 5202:1998. Sr content of the raw materials was measured in compliance with "Methods for determination of minor components in cement by ICP atomic emission spectroscopy and electrothermal atomic absorption spectrometry" as defined in standard test method JCAS I-52 2000 of the Japan Cement Association.

[Cement Clinker Raw Materials]

The basic unit of each raw material used for the cement clinker raw materials, with the exception of limestone, coal ash and soil generated by construction work, consisted of 20 kg to 150 kg of silica ton per ton of clinker, 0 kg to 100 kg of clay per ton of clinker, 0 kg to 100 kg of blast furnace slag per ton of clinker, 0 kg to 100 kg of sewage sludge per ton of clinker, 0 kg to 100 kg of hydrocake per ton of clinker, and 30 kg to 80 kg of iron sources per ton of clinker.

The basic raw material units (basic units) of limestone, coal ash and soil generated by construction work, which are cement clinker raw materials that have a large effect on Sr content of the cement composition, the contents of Sr and MgO (contained percentages (mass %) based on the total mass of the raw materials for forming 1 ton of cement clinker) introduced from each of the aforementioned raw materials into 1 ton of cement clinker, and the contents of Sr and MgO (contained percentages (mass %) based on the total mass of the raw materials for forming 1 ton of cement clinker) introduced from a mixture of raw materials consisting of limestone, coal ash and soil generated by construction work into 1 ton of cement clinker are shown in Table 3. Table 3 also indicates the mass ratio of soil generated by construction work to coal ash (soil generated by construction work (kg/t clinker)/coal ash (kg/t clinker)) and the contents of Sr and MgO in the mixture of coal ash and soil generated by construction work (contained percentages (mass %) based on the total mass of the mixture of coal ash and soil generated by construction work). Sr content was measured in compliance with "Methods for determination of minor components in cement by ICP atomic emission spectroscopy and electrothermal atomic absorption spectrometry" as defined in standard test method JCAS I-52 2000 of the Japan Cement Association. MgO content was measured in compliance with "Methods for chemical analysis of Portland cement" as defined in JIS R 5202:1998.

TABLE 3

| | (1) Limestone | | | (2) Coal ash | | | (3) Soil generated by construction work | | | Sr content from 3 raw materials (1) + (2) + (3) (mass %) | | Ratio of usage of soil generated by construction work to coal ash (3)/(2) | Mixture of (2) coal ash and (3) soil generated by construction work (mass %) | |
|---|---|---|---|---|---|---|---|---|---|---|---|---|---|---|
| | Basic unit (kg/t clinker) | Amount introduced into clinker (mass %) | | Basic unit (kg/t clinker) | Amount introduced into clinker (mass %) | | Basic unit (kg/t clinker) | Amount introduced into clinker (mass %) | | | | | | |
| | | Sr | MgO | | Sr | MgO | | Sr | MgO | Sr | MgO | | Sr | MgO |
| Example 1 | 1100 | 0.0495 | 0.88 | 100 | 0.0106 | 0.10 | 50 | 0.0014 | 0.09 | 0.0615 | 1.07 | 0.50 | 0.0797 | 1.23 |
| Example 2 | Limestone A | | | 140 | 0.0148 | 0.13 | 100 | 0.0027 | 0.18 | 0.0671 | 1.19 | 0.71 | 0.0732 | 1.30 |
| Example 3 | | | | 150 | 0.0159 | 0.14 | 150 | 0.0041 | 0.27 | 0.0695 | 1.29 | 1.00 | 0.0666 | 1.37 |
| Example 4 | | | | 100 | 0.0106 | 0.10 | 20 | 0.0005 | 0.04 | 0.0606 | 1.01 | 0.20 | 0.0929 | 1.10 |
| Example 5 | | | | 250 | 0.0265 | 0.24 | 50 | 0.0014 | 0.09 | 0.0774 | 1.21 | 0.20 | 0.0929 | 1.10 |
| Example 6 | | | | 160 | 0.0170 | 0.15 | 50 | 0.0014 | 0.09 | 0.0678 | 1.12 | 0.31 | 0.0872 | 1.16 |
| Example 7 | | | | 190 | 0.0201 | 0.18 | 70 | 0.0019 | 0.12 | 0.0715 | 1.19 | 0.37 | 0.0848 | 1.18 |
| Comparative example 1 | 1100 Limestone B | 0.0201 | 0.40 | 100 | 0.0106 | 0.10 | 30 | 0.0008 | 0.05 | 0.0315 | 0.55 | 0.30 | 0.0878 | 1.15 |
| Comparative example 2 | | | | 120 | 0.0127 | 0.12 | 5 | 0.0001 | 0.01 | 0.0330 | 0.52 | 0.04 | 0.1028 | 0.99 |
| Comparative example 3 | | | | 150 | 0.0159 | 0.14 | 100 | 0.0027 | 0.18 | 0.0388 | 0.72 | 0.67 | 0.0745 | 1.29 |
| Comparative example 4 | | | | 250 | 0.0265 | 0.24 | 50 | 0.0014 | 0.09 | 0.0480 | 0.73 | 0.20 | 0.0929 | 1.10 |
| Comparative example 5 | | | | 50 | 0.0053 | 0.05 | 180 | 0.0049 | 0.32 | 0.0303 | 0.76 | 3.60 | 0.0443 | 1.60 |
| Comparative example 6 | 1100 Limestone A | 0.0495 | 0.88 | 170 | 0.0180 | 0.05 | 80 | 0.0022 | 0.14 | 0.0697 | 0.59 | 0.47 | 0.0808 | 1.22 |

[Production of Cement Clinker]

The aforementioned cement clinker raw materials were mixed, and the mixed raw materials were burned in an NSP kiln at a maximum temperature of 1200° C. to 1500° C. to produce a cement clinker The temperature of the cement clinker near the outlet of the NSP kiln was 1000° C. to 1500° C. This cement clinker was then cooled with a clinker cooler provided downstream from the rotary kiln from 1000° C. to 1400° C. to 100° C. to 200° C. at a cooling rate of 10° C./min to 60° C./min.

The resulting cement clinker was mixed with gypsum dihydrate so that the $SO_3$ content of the cement composition was 2 mass % after which an admixture consisting of 4 mass % of limestone and 1 mass % of blast furnace slag was further added followed by grinding with an existing mill to a Blaine specific surface area of 3200 cm$^2$/g to 3500 cm$^2$/g to obtain a cement composition.

[Chemical Components of Cement Compositions]

Contained percentages (mass %) based on total mass were measured for the $SiO_2$, $Al_2O_3$, $Fe_2O_3$, CaO, MgO and $SO_3$ in the resulting cement compositions. These contained percentages were measured in compliance with "Methods for chemical analysis of Portland cement" as defined in JIS R 5202: 1998. The free CaO content of the cement compositions was measured in compliance with "Quantification of free calcium oxide" defined in JCAS I-01:1997. The Sr content of the cement compositions was measured in compliance with "Methods for determination of minor components in cement by ICP atomic emission spectroscopy and electrothermal atomic absorption spectrometry" as defined in standard test method JCAS I-52 2000 of the Japan Cement Association. The results are shown in Table 4.

[Mineral Compositions of Cement Compositions]

<Mineral Compositions of Cement Compositions>

The mineral compositions of the resulting cement compositions ($C_3S$ content, $C_2S$ content, $C_3A$ content and $C_4AF$ content) were measured based on Bogue equations [1] to [4] and XRD/Rietveld analysis. The results are shown in Table 6.

<XRD/Rietveld Analysis>

Powder X-ray diffraction analysis was carried out using the RINT-2500 Powder X-Ray Diffraction Analyzer (Rigaku Corp.) and CuKα for the X-ray source under conditions of an X-ray tube voltage of 35 kV, X-ray tube current of 110 mA, measuring range of 2θ=10° to 60°, step width of 0.02°, count time of 2 seconds, scattering slit of 1° and light receiving slit of 0.15 mm. The resulting X-ray diffraction profile was analyzed with Rietveld analysis software (JADE 6) to obtain parameters of crystal data for each of the clinker minerals. Here, crystal structure data for each type of clinker mineral as well as reference documents used in Rietveld analysis are shown in Table 5.

TABLE 4

| | Chemical components of cement composition (mass %) | | | | | | | |
|---|---|---|---|---|---|---|---|---|
| | $SiO_2$ | $Al_2O_3$ | $Fe_2O_3$ | CaO | MgO | $SO_3$ | f. CaO | Sr |
| Example 1 | 21.14 | 5.57 | 2.77 | 64.03 | 1.10 | 1.89 | 1.15 | 0.0700 |
| Example 2 | 19.50 | 5.30 | 2.81 | 63.97 | 2.43 | 2.06 | 0.45 | 0.0773 |
| Example 3 | 20.75 | 5.72 | 2.78 | 64.44 | 1.04 | 1.77 | 0.94 | 0.0776 |
| Example 4 | 20.16 | 5.05 | 2.67 | 63.43 | 2.55 | 2.03 | 0.44 | 0.0938 |
| Example 5 | 21.05 | 5.78 | 2.66 | 64.45 | 1.86 | 1.81 | 0.46 | 0.0720 |
| Example 6 | 19.73 | 5.28 | 2.82 | 63.77 | 2.35 | 2.06 | 0.35 | 0.0842 |
| Example 7 | 20.36 | 4.91 | 2.64 | 63.66 | 2.37 | 2.03 | 0.42 | 0.1062 |
| Comparative example 1 | 20.29 | 5.42 | 2.91 | 64.52 | 1.17 | 1.91 | 0.91 | 0.0394 |
| Comparative example 2 | 20.49 | 5.57 | 3.04 | 64.40 | 0.98 | 1.81 | 0.53 | 0.0340 |
| Comparative example 3 | 20.65 | 5.59 | 2.86 | 63.78 | 1.53 | 1.88 | 1.82 | 0.0484 |
| Comparative example 4 | 20.76 | 5.68 | 2.85 | 64.24 | 1.79 | 1.83 | 1.08 | 0.0600 |
| Comparative example 5 | 20.18 | 5.71 | 2.86 | 64.56 | 2.23 | 1.80 | 0.37 | 0.0384 |
| Comparative example 6 | 20.70 | 5.79 | 2.64 | 64.51 | 1.00 | 1.68 | 0.77 | 0.0922 |

As shown in Table 4, in Examples 1 to 7, it was able to be adjusted that the cement composition has the Sr content of 0.07 mass % to 0.1062 mass % and the MgO content of 1.04 mass % to 2.55 mass % as shown in Table 4 by using cement clinker prepared so that the mass ratio of soil generated by construction work to coal ash (soil generated by construction work/coal ash) was 0.15 to 1.5 corresponding to limestone in which the amount of Sr introduced into the clinker was 0.0495 mass %. On the other hand, in Comparative Examples 1 to 6, since cement clinker was used that was produced by mixing the cement clinker raw materials without adjusting the basic raw material units of the cement clinker raw materials so that the Sr content and MgO content in the cement compositions were within the specified ranges, the cement compositions had the Sr content of 0.034 mass % to 0.06 mass % (Comparative Examples 1 to 5), which is outside the range of the Sr content of the cement composition of the present invention, or the MgO content of 1.0 mass % or less (Comparative Examples 2 and 6), which is outside the range of the MgO content of the cement composition of the present invention.

TABLE 5

| Mineral component | Crystal system/space group | Reference document |
|---|---|---|
| Alite | Monoclinic/Cm | Reference Document 1 |
| Belite | Monoclinic/P21n | Reference Document 2 |
| Aluminate phase | Cubic/Pa | Reference Document 3 |
| | Orthorhombic/Pbca | Reference Document 4 |
| Ferrite phase | Orthorhombic/Ima2 | Reference Document 5 |

Reference Document 1: F. Nishi and Y. Takeuchi: Tricalcium silicate $Ca_3O[SiO_4]$: The monoclinic Superstructure, Zeitschrift fur Krystallographie, Vol. 172, pp. 297-314 (1985)

Reference Document 2: K. H. Jost, B. Xiemer and R. Seydel: Redetermination of the Structure of β-Dicalcium Silicate, Acta Crystallographica, Vol. B33, pp. 1696-1700 (1977)

Reference Document 3: P. Mondal and W. J. Jeffrey: The Crystal Structure of Tricalcium Aluminate, Acta Crystallographica, Vol. 36, pp. 689-697 (1975)

Reference Document 4: Y. Takeuchi and F. Nishi: Crystal-chemical Characterization of the 3CaO—Al$_2$O$_3$—Na$_2$O Solid Solution Series, Zeitschrift fur Kristallographie, Vol. 152, pp. 259-307 (1980)

Reference Document 5: A. A. Colville and S. Geller: The Crystal Structure of Brownmillerite, Ca$_2$FeAlO$_5$, Acta Crystallographica, Vol. B27, p. 2311 (1971)

[Physical Properties of Cement Compositions]

Physical properties of the resulting cement compositions were measured in the manner described below. The measurement results are shown in Table 6.

<Powder Characteristics of Cement Compositions>

The powder characteristics of the cement compositions (Blaine specific surface area and 45 μm residue) were measured in compliance with "Physical testing methods for cement" as defined in JIS R 5201:1997.

<Color b Value>

The color b value of the cement compositions was measured using a color difference meter (Spectro Color Meter Se2000 manufactured by Nippon Denshoku Industries Co., Ltd.).

<Setting and Mortar Compressive Strength>

Setting and mortar compressive strength were measured using the resulting cement compositions in compliance with "Physical testing methods for cement" as defined in JIS R 5201:1997.

<Concrete Testing>

Concrete testing was carried out using a target slump of 18 cm, W/C ratio of 55%, s/a ratio of 47% and admixture content of 0.25%, and adjusting the water content so as to obtain the target slump. The results are shown in Table 7. Here, the meanings of W/C ratio and s/a ratio and the fine aggregate, coarse aggregate and admixture used are as indicated below.

W/C ratio: Water to cement ratio (mass ratio)

s/a ratio: Fine aggregate to total aggregate ratio (=fine aggregate÷total aggregate (fine aggregate+coarse aggregate)) (volume ratio)

Fine aggregate: Mixed sand (ocean sand (from Hakata) 50%+crushed sand (Sumitomo Coal Mining) 50%)

Coarse aggregate: From Miyano, Yamaguchi Prefecture 2015/50%+1505/50%

Admixture: AE water reducing agent, Pozzolith No. 70 (BASF Pozzolith Ltd.)

Water: Tap water

The mixer, mixing volume and procedure used when mixing the concrete were as indicated below.

Mixer: Forced twin-shaft mixer (nominal volume: 55 L)

Mixing volume: 30 L/batch

Mixing time and procedure:
1) mixer loaded with fine aggregate and cement followed by dry mixing for 10 seconds;
2) water (containing admixture) added followed by mixing for 60 seconds;
3) coarse aggregate added followed by mixing for 60 seconds, allowing to stand undisturbed for 5 minutes, mixing for 15 seconds and discharging; and
4) test sample fabricated in compliance with JIS A 1132.

The evaluation parameters and test methods used to evaluate concrete performance were as indicated below. Slump was measured in compliance with JIS A 1101, while compressive strength was measured in accordance with JIS A 1108 at a concrete age of 28 days.

TABLE 6

| | Mineral composition (mass %) | | | | | | | |
| --- | --- | --- | --- | --- | --- | --- | --- | --- |
| | Bogue equations | | | | XRD- Rietveld analysis | | | |
| | B—C$_3$S | B—C$_2$S | B—C$_3$A | B—C$_4$AF | R—C$_3$S | R—C$_2$S | R—C$_3$A | R—C$_4$AF |
| Example 1 | 53.2 | 20.6 | 9.1 | 8.4 | 60.0 | 19.3 | 10.1 | 8.3 |
| Example 2 | 66.7 | 5.7 | 9.3 | 8.5 | 75.8 | 4.2 | 4.1 | 15.9 |
| Example 3 | 57.1 | 16.5 | 9.5 | 8.5 | 58.6 | 19.4 | 10.9 | 8.8 |
| Example 4 | 61.4 | 11.6 | 8.9 | 8.1 | 67.3 | 15.4 | 3.5 | 13.8 |
| Example 5 | 54.5 | 19.3 | 9.3 | 8.1 | 57.5 | 19.9 | 6.6 | 8.6 |
| Example 6 | 64.2 | 8.2 | 9.2 | 8.6 | 69.0 | 9.4 | 5.1 | 16.5 |
| Example 7 | 61.8 | 11.8 | 8.5 | 8.0 | — | — | — | — |
| Comparative example 1 | 62.4 | 11.2 | 9.4 | 8.8 | 60.0 | 16.2 | 11.3 | 12.5 |
| Comparative example 2 | 59.4 | 14.0 | 9.6 | 9.2 | 60.7 | 15.2 | 13.0 | 11.1 |
| Comparative example 3 | 55.6 | 17.3 | 10.0 | 8.7 | 56.0 | 20.9 | 10.2 | 12.9 |
| Comparative example 4 | 56.2 | 17.2 | 9.4 | 8.7 | 57.2 | 19.5 | 8.3 | 9.9 |
| Comparative example 5 | 61.8 | 11.3 | 9.5 | 8.7 | 59.7 | 16.8 | 6.8 | 9.3 |
| Comparative example 6 | 57.8 | 15.9 | 10.9 | 8.0 | 57.9 | 18.6 | 15.2 | 8.3 |

TABLE 7

| | Powder characteristics | | | Setting time | | | Mortar Compressive strength - age 28 days (N/mm$^2$) | Concrete | | |
| --- | --- | --- | --- | --- | --- | --- | --- | --- | --- | --- |
| | Blaine specific surface area (cm$^2$/g) | 45 μm residue (mass %) | Color b value (—) | Water content (%) | Initial setting (min) | Final setting (min) | | Slump (cm) | Water amount (kg/m$^3$) | Compressive strength (N/mm$^2$) |
| Example 1 | 3200 | 12.2 | 7.90 | 27.2 | 124 | 184 | 60.5 | 18.0 | 178 | — |
| Example 2 | 3260 | 6.2 | 6.16 | — | — | — | 62.4 | | 175 | — |
| Example 3 | 3300 | 8.6 | 8.28 | — | — | — | 62.8 | | — | — |

TABLE 7-continued

| | Powder characteristics | | | Setting time | | | Mortar Compressive strength - age 28 days (N/mm$^2$) | Concrete | | |
|---|---|---|---|---|---|---|---|---|---|---|
| | Blaine specific surface area (cm$^2$/g) | 45 μm residue (mass %) | Color b value (—) | Water content (%) | Initial setting (min) | Final setting (min) | | Slump (cm) | Water amount (kg/m$^3$) | Compressive strength (N/mm$^2$) |
| Example 4 | 3360 | 5.8 | 6.66 | — | — | — | 61.2 | | — | — |
| Example 5 | 3400 | 8.7 | 7.80 | 27.2 | 116 | 176 | 64.2 | | 177 | 44.0 |
| Example 6 | 3400 | 6.4 | 6.13 | 27.4 | 164 | 229 | 60.6 | | — | — |
| Example 7 | 3380 | 5.7 | 6.06 | 27.6 | 140 | 201 | 59.2 | | — | — |
| Comparative example 1 | 3320 | 8.3 | 6.77 | 28.2 | 112 | 179 | 63.5 | | 180 | — |
| Comparative example 2 | 3310 | 9.0 | 7.53 | — | — | — | 61.9 | | — | — |
| Comparative example 3 | 3320 | 10.2 | 6.37 | — | — | — | 59.9 | | 181 | — |
| Comparative example 4 | 3470 | 8.5 | 7.43 | — | — | — | 60.5 | | 185 | 42.7 |
| Comparative example 5 | 3400 | 7.2 | 7.17 | 28.2 | 130 | 190 | 64.4 | | — | — |
| Comparative example 6 | 3270 | 9.3 | 7.87 | 28.6 | 139 | 199 | 62.4 | | — | — |

As shown in Table 7, the amounts of water required for normal consistency of cement paste of Example 1 and Examples 5 to 7 were less than that of Comparative Example 1 and 5 to 6. In the case of concrete as well, the water contents of Examples 1, 2 and 5 were less than that of Comparative Examples 1, 3 and 4. That is, fluidity of mortar and concrete was improved by making the cement composition to have the Sr content of 0.065 mass % to 1.0 mass %, and the MgO content of greater than 1.0 mass % to 3.0 mass %.

As shown in Table 7, the mortar that used the cement compositions of Examples 1 to 6 demonstrated compressive strength at a concrete age of 28 days of 60 N/mm$^2$ or more, and strength development was able to be confirmed to be maintained. Furthermore, when the free CaO content of the cement composition exceeded 1.5 mass % as in Comparative Example 3, the compressive strength at a concrete age of 28 days was less than 60 N/mm$^2$ and strength development decreased.

As shown in Tables 3 to 7, even in the case of using waste in the form of coal ash and soil generated by construction work, which are desired to be used effectively, and having increased the amount of Al introduced into cement clinker by using these raw materials, by adjusting the basic raw material units of the cement clinker raw materials so the Sr content and MgO content of the cement composition are within fixed ranges, the fluidity of mortar and concrete using the resulting cement composition can be improved. Moreover, strength development can be maintained by making the cement composition to have the free CaO content of 1.5 mass % or less.

The relationship between Sr contents and MgO contents of the cement compositions of Examples 1 to 7 (Sr contents of 0.07 mass % to 0.1062 mass % and MgO contents of 1.04 mass % to 2.55 mass %) and the cement compositions of Comparative Examples 1 to 6 (Sr contents of 0.034 mass % to 0.06 mass % and MgO contents of 1.0 mass % or less) and the amount of water required for normal consistency of cement paste or water content is shown in FIG. 1.

As shown in FIG. 1 (and with reference to Tables 4, 6 and 7), if the Sr content was 0.07 mass % to 0.1062 mass % and the MgO content was 1.04 mass % to 2.55 mass % as in Examples 1, 2 and 5 to 7, the amount of water required for normal consistency of cement paste (amount of water for achieving a standard consistency of cement paste) was less than 28.0% (indicated with white circles (○) in FIG. 1 indicating amount of water required for normal consistency of cement paste of <28.0%) and the water amount of the concrete was less than 180 kg/m$^3$ (indicated with white triangles (Δ) in FIG. 1 indicating water content of <180 kg/m$^3$), thus indicating that the amount of water required for normal consistency of cement paste and/or concrete water content were able to be reduced. Even in the case of a comparatively large value for R—C$_3$A of 10.1 as in the cement composition of Example 1, if the Sr content was 0.065 mass % to 1.0 mass % and the MgO content was greater than 1.0 mass % to 3.0 mass %, the amount of water required for normal consistency of cement paste was able to be reduced to less than 28.0% and the concrete water content was able to be reduced to less than 180 kg/m$^3$.

On the other hand, if the cement composition did not satisfy either one of the values of the Sr content of 0.065 mass % to 1.0 mass % or the MgO content of greater than 1.0 mass % to 3.0 mass % as in the cement compositions of Comparative Examples 1 and 3 to 6 shown in FIG. 1 (and with reference to Tables 4, 6 and 7), the amount of water required for normal consistency of cement paste increased to 28.0% or more (indicated with black circles (●) in FIG. 1 indicating amount of water required for normal consistency of cement paste of ≥28.0%) and the water amount of the concrete increased to 180 kg/m$^3$ or more (indicated with black triangles (▲) in FIG. 1 indicating water content of ≥180 kg/m$^3$). For example, even if the cement composition satisfied with the value of the MgO content of greater than 1.0 mass % to 3.0 mass % but did not satisfy the value of the Sr content of 0.065 mass % to 1.0 mass % as in the cement compositions of Comparative Examples 1 and 3 to 5, the amount of water required for normal consistency of cement paste increased to 28.0% or more or the concrete water content increased to 180 kg/m$^3$ or more. Even if the cement composition satisfied with the value of the Sr content of 0.065 mass % to 1.0 mass % but did not satisfy the value of the MgO content of greater than 1.0 mass % to 3.0 mass % as in the cement composition of Comparative Example 6, the amount of water required for normal consistency of cement paste increased to 28.0% or more.

Example 8 and Comparative Example 7

An example in which Sr content was made to be within a specified range using waste shells is described below.

In Example 8, shells in the form of oyster shells were used as a partial substitute for the limestone B shown in Table 2. The shells had a CaO content of 48 mass %, Sr content of 0.13 mass % and MgO content of 0.53 mass %. 10 mass % of limestone B was replaced with the shells. The same raw materials used in Comparative Examples 1 to 5 were used for the other raw materials. Table 8 indicates the basic units of the calcium source raw materials (limestone and shells), coal ash and soil generated by construction work, the contents of Sr (mass %) introduced from each of the aforementioned raw materials per ton of cement clinker, the content of Sr (mass %) introduced from the mixture of raw materials consisting of limestone, coal ash and soil generated by construction work per ton of cement clinker, the mass ratio of soil generated by construction work to coal ash, and the Sr content (mass %) of the mixture of coal ash and soil generated by construction work. Moreover, cement compositions were obtained using the same method as the examples and Comparative Examples 1 to 5, and the Sr contents of the cement compositions were measured. The results are shown in Table 8. Sr content was measured in compliance with "Methods for determination of minor components in cement by ICP atomic emission spectroscopy and electrothermal atomic absorption spectrometry" as defined in standard test method J CAS 1-52 2000 of the Japan Cement Association.

cement clinker by adjusting the basic raw material units of the cement clinker raw materials such that the mass ratio of soil generated by construction work to coal ash was 0.13 to 1.6 corresponding to the limestone, the resulting cement composition was able to have the Sr content of 0.072 mass %.

The invention claimed is:

1. A cement composition having a Sr content of 0.065 mass % to 1.0 mass % and a MgO content of greater than 1.0 mass % to 3.0 mass %.

2. The cement composition according to claim 1, which has a free CaO content of 1.5 mass % or less.

3. The cement composition according to claim 1, which has a $SO_3$ content of 1.6 mass % to 2.6 mass %.

4. The cement composition according to claim 1, which has a $C_3S$ content of 50 mass % to 70 mass %, a $C_2S$ content of 5 mass % to 25 mass %, a $C_3A$ content of 6 mass % to 15 mass % and a $C_4AF$ content of 7 mass % to 15 mass %.

5. A process for producing a cement composition comprising:
    a step (A) of adjusting the basic raw material units of raw materials selected from the group consisting of limestone, silica stone, coal ash, clay, blast furnace slag, soil generated by construction work, sewage sludge, hydrocake and iron sources so that the cement composition has a Sr content of 0.065 mass % to 1.0 mass % and a MgO content of greater than 1.0 mass % to 3.0 mass %, blending the adjusted raw materials and burning to produce cement clinker, and

TABLE 8

| | | (1) Limestone | | (2) Coal ash | | | (3) Soil generated by construction work | | |
| --- | --- | --- | --- | --- | --- | --- | --- | --- | --- |
| | | Amount introduced into clinker (mass %) | | Basic unit (kg/t clinker) | Amount introduced into clinker (mass %) | | Basic unit (kg/t clinker) | Amount introduced into clinker (mass %) | |
| | | Sr | MgO | | Sr | MgO | | Sr | MgO |
| Example 8 | 1100 Mixture of limestone B + shells = 90% + 10% (Sr content: 0.0183 mass %) | 0.0324 | 0.17 | 250 | 0.0265 | 0.24 | 50 | 0.0014 | 0.09 |
| Comparative example 7 | 1100 Limestone B (Sr content: 0.0183 mass %) | 0.0201 | 0.40 | | | | | | |

| | | Content from 3 raw materials (1) + (2) + (3) (mass %) | | Ratio of usage of soil generated by construction work to coal ash (3)/(2) | Content in mixture of (2) coal ash and (3) soil generated by construction work (mass %) | | Content in cement composition (mass %) | |
| --- | --- | --- | --- | --- | --- | --- | --- | --- |
| | | Sr | MgO | | Sr | MgO | Sr | MgO |
| | Example 8 | 0.0603 | 0.50 | 0.20 | 0.0929 | 1.10 | 0.0720 | 1.56 |
| | Comparative example 7 | 0.0480 | 0.73 | | | | 0.0600 | 1.79 |

As shown in Table 8, even in the case of using limestone having a small amount of Sr introduced into the clinker of 0.201 mass %, by using shells as a partial substitute for the limestone, the amount of Sr introduced into the cement clinker was able to be made to be 0.03 mass % or more, and the Sr content of the cement composition was able to be made to be 0.07 mass % or more. As shown in Table 8, by producing a step (B) of mixing the cement clinker with gypsum and an admixture of limestone and blast furnace slag followed by grinding.

6. The process for producing a cement composition according to claim 5, wherein shells are used as a partial substitute for the limestone.

7. The process for producing a cement composition according to claim 5, wherein 700 kg to 1400 kg of limestone, 20 kg to 150 kg of silica stone, 0 kg to 300 kg of coal ash, 0 kg to 100 kg of clay, 0 kg to 100 kg of blast furnace slag, 10 kg to 150 kg of soil generated by construction work, 0 kg to 100 kg of sewage sludge, 0 kg to 100 kg of hydrocake and 30 kg to 80 kg of iron sources are blended per ton of cement clinker for use as the cement clinker raw materials in the step (A).

8. The process for producing a cement composition according to claim 5, wherein soil generated by construction work and coal ash are blended in the step (A) so that the mass ratio of soil generated by construction work to coal ash is 0.13 to 1.6.

9. The process for producing a cement composition according to claim 5, wherein the soil generated by construction work has a Sr content of 0.01 mass % to 1.0 mass %, and the coal ash has a Sr content of 0.02 mass % to 0.4 mass % in the step (A).

10. The cement composition according to claim 2, which has a $SO_3$ content of 1.6 mass % to 2.6 mass %.

11. The cement composition according to claim 2, which has a $C_3S$ content of 50 mass % to 70 mass %, a $C_2S$ content of 5 mass % to 25 mass %, a $C_3A$ content of 6 mass % to 15 mass % and a $C_4AF$ content of 7 mass % to 15 mass %.

12. The cement composition according to claim 3, which has a $C_3S$ content of 50 mass % to 70 mass %, a $C_2S$ content of 5 mass % to 25 mass %, a $C_3A$ content of 6 mass % to 15 mass % and a $C_4AF$ content of 7 mass % to 15 mass %.

13. The cement composition according to claim 10, which has a $C_3S$ content of 50 mass % to 70 mass %, a $C_2S$ content of 5 mass % to 25 mass %, a $C_3A$ content of 6 mass % to 15 mass % and a $C_4AF$ content of 7 mass % to 15 mass %.

14. The process for producing a cement composition according to claim 6, wherein 700 kg to 1400 kg of limestone, 20 kg to 150 kg of silica stone, 0 kg to 300 kg of coal ash, 0 kg to 100 kg of clay, 0 kg to 100 kg of blast furnace slag, 10 kg to 150 kg of soil generated by construction work, 0 kg to 100 kg of sewage sludge, 0 kg to 100 kg of hydrocake and 30 kg to 80 kg of iron sources are blended per ton of cement clinker for use as the cement clinker raw materials in the step (A).

15. The process for producing a cement composition according to claim 6, wherein soil generated by construction work and coal ash are blended in the step (A) so that the mass ratio of soil generated by construction work to coal ash is 0.13 to 1.6.

16. The process for producing a cement composition according to claim 7, wherein soil generated by construction work and coal ash are blended in the step (A) so that the mass ratio of soil generated by construction work to coal ash is 0.13 to 1.6.

17. The process for producing a cement composition according to claim 14, wherein soil generated by construction work and coal ash are blended in the step (A) so that the mass ratio of soil generated by construction work to coal ash is 0.13 to 1.6.

18. The process for producing a cement composition according to claim 6, wherein the soil generated by construction work has a Sr content of 0.01 mass % to 1.0 mass %, and the coal ash has a Sr content of 0.02 mass % to 0.4 mass % in the step (A).

19. The process for producing a cement composition according to claim 7, wherein the soil generated by construction work has a Sr content of 0.01 mass % to 1.0 mass %, and the coal ash has a Sr content of 0.02 mass % to 0.4 mass % in the step (A).

20. The process for producing a cement composition according to claim 8, wherein the soil generated by construction work has a Sr content of 0.01 mass % to 1.0 mass %, and the coal ash has a Sr content of 0.02 mass % to 0.4 mass % in the step (A).

* * * * *